(12) United States Patent
Park

(10) Patent No.: US 7,796,227 B2
(45) Date of Patent: Sep. 14, 2010

(54) LIQUID CRYSTAL DISPLAY PANEL AND FABRICATING METHOD THEREOF

(75) Inventor: Jong Woo Park, Buk-gu (KR)

(73) Assignee: LG Display Co., Ltd., Seoul (KR)

( * ) Notice: Subject to any disclaimer, the term of this patent is extended or adjusted under 35 U.S.C. 154(b) by 972 days.

(21) Appl. No.: 11/260,287

(22) Filed: Oct. 28, 2005

(65) Prior Publication Data

US 2006/0139554 A1 Jun. 29, 2006

(30) Foreign Application Priority Data

Dec. 23, 2004 (KR) .................. 10-2004-0111516

(51) Int. Cl.
*G02F 1/1345* (2006.01)

(52) U.S. Cl. ...................... 349/149; 349/153

(58) Field of Classification Search ............. None
See application file for complete search history.

(56) References Cited

U.S. PATENT DOCUMENTS

| 5,162,933 A | 11/1992 | Kakuda et al. |
|---|---|---|
| 5,317,433 A | 5/1994 | Miyawaki et al. |
| 5,339,181 A | 8/1994 | Kim et al. |
| 5,462,887 A | 10/1995 | Glück |
| 5,668,379 A | 9/1997 | Ono et al. |
| 5,731,856 A | 3/1998 | Kim et al. |
| 5,771,083 A | 6/1998 | Fujihara et al. |
| 5,793,460 A | 8/1998 | Yang |
| 5,847,781 A | 12/1998 | Ono et al. |
| 2002/0176044 A1* | 11/2002 | Lim .......................... 349/149 |
| 2003/0122979 A1* | 7/2003 | Morimitsu ................ 349/42 |
| 2005/0078264 A1* | 4/2005 | Yoo et al. ................. 349/152 |

* cited by examiner

*Primary Examiner*—David Nelms
*Assistant Examiner*—Lucy P Chien
(74) *Attorney, Agent, or Firm*—McKenna Long & Aldridge

(57) ABSTRACT

This invention relates to a liquid crystal display panel adapted to prevent corrosion of a pad electrode and reduce a liquid crystal margin area, and a fabricating method thereof. A liquid crystal display panel includes first and second substrates bonded with a sealant; a signal line on the first substrate; a pad formed on a different plane than the signal line; and a contact part overlapping the sealant and connecting the signal line to the pad.

9 Claims, 14 Drawing Sheets

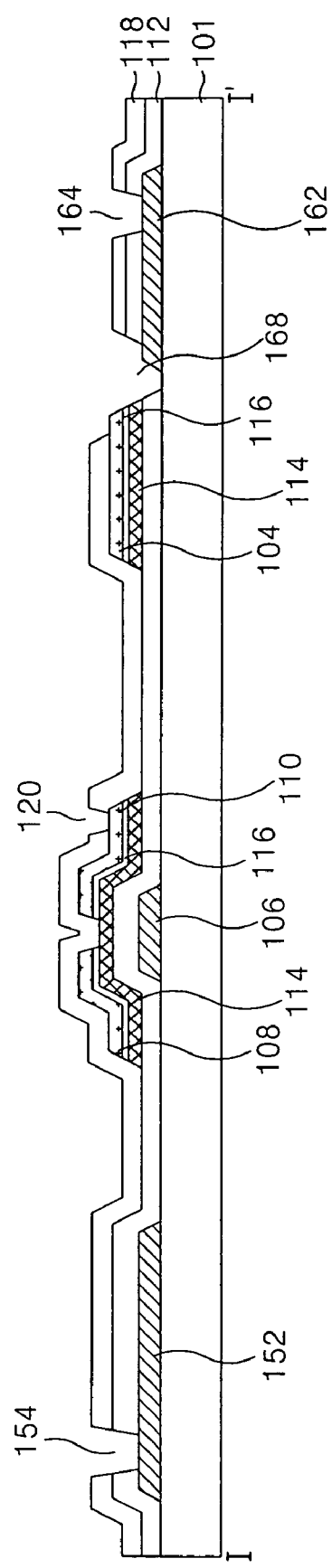

LIQUID CRYSTAL DISPLAY PANEL AND FABRICATING METHOD THEREOF

This application claims the benefit of Korean Patent Application No. P2004-111516 filed on Dec. 23, 2004, which is hereby incorporated by reference for all purposes as if fully set forth herein.

BACKGROUND OF THE INVENTION

1. Field of the Invention

The present invention relates to a liquid crystal display panel and a fabricating method thereof, and more particularly to a liquid crystal display panel that is adapted to prevent corrosion of a pad electrode and reduce a liquid crystal margin area, and a fabricating method thereof.

2. Description of the Related Art

Generally, a liquid crystal display device (LCD) has liquid crystal cells which are arranged in a matrix shape in a liquid crystal display panel. The liquid crystal display device controls its light transmittance using a video signal to display a picture.

The liquid crystal display device, as shown in FIGS. 1 and 2, includes a thin film transistor substrate 70 and a color filter substrate 80 which oppose each other with a liquid crystal layer 16 therebetween.

In the color filter substrate 80, a color filter array having a black matrix 28 for preventing light leakage, a color filter 22 for realizing color, a common electrode 14 that forms a vertical electric field with a pixel electrode 32, and an upper alignment film (not shown) for aligning liquid crystal are formed on an upper substrate 11.

In the thin film transistor substrate 70, a thin film transistor array including a gate line 2 and a data line 4 formed to cross each other, a thin film transistor formed at a crossing of the gate line 2 and the data line 4, a pixel electrode 32 connected to the thin film transistor 30, and a lower alignment film (not shown) for aligning liquid crystal are formed on a lower substrate 1.

The gate line 2 is connected to a gate driver (not shown) through a gate pad 50. The gate pad 50, as shown in FIG. 2A, includes a gate pad lower electrode 52 extended from the gate line 2, and a gate pad upper electrode 56 connected to the gate pad lower electrode 52 through a gate contact hole 54 which penetrates a gate insulating film 12 and a passivation film 18.

The data line 4 is connected to a data driver (not shown) through a data pad 60. The data pad 60, as shown in FIG. 2B, includes a data pad lower electrode 62 extended from the data line 4, and a data pad upper electrode 66 connected to the data pad lower electrode 62 through a data contact hole 64 which penetrates the passivation film 18 above a gate insulating film 12.

There is a problem in the related art in that the etching of a transparent conductive material to form the data pad upper electrode 66 and the gate pad upper electrode 56, as well as the gate contact hole 54 and the data contact hole 64, causes corrosion of the data pad lower electrode 62. In this case, there is a problem as a data signal cannot be supplied to the data line 4 because the data pad lower electrode 62 is not in contact with the data pad upper electrode 66.

SUMMARY OF THE INVENTION

Accordingly, the present invention is directed to a liquid crystal display panel and a fabricating method thereof that substantially obviates one or more of the problems due to limitations and disadvantages of the related art.

An advantage of the present invention is to provide a liquid crystal display panel adapted to prevent corrosion of a pad electrode and reduce a liquid crystal margin area.

Another advantage of the present invention is to provide a fabricating method of the liquid crystal display panel.

Additional features and advantages of the invention will be set forth in the description which follows, and in part will be apparent from the description, or may be learned from practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display panel includes first and second substrates bonded with a sealant; a signal line on the first substrate; a pad formed on a different plane than the signal line; and a contact part overlapping the sealant and connecting the signal line to the pad.

In another aspect of the present invention, a method of fabricating a liquid crystal display panel includes forming a signal line on a first substrate; forming a pad on a different plane than the signal line; forming a contact part connecting the signal line to the pad; and forming a sealant bonding the first substrate and a second substrate in an area, the contact part overlapping the sealant in the area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A to 6D are sectional diagrams for explaining a fabricating method of a thin film transistor substrate shown in FIG. 4;

DETAILED DESCRIPTION OF THE ILLUSTRATED EMBODIMENTS

Reference will now be made in detail to embodiments of the present invention, examples of which are illustrated in the accompanying drawings.

Figure 1:
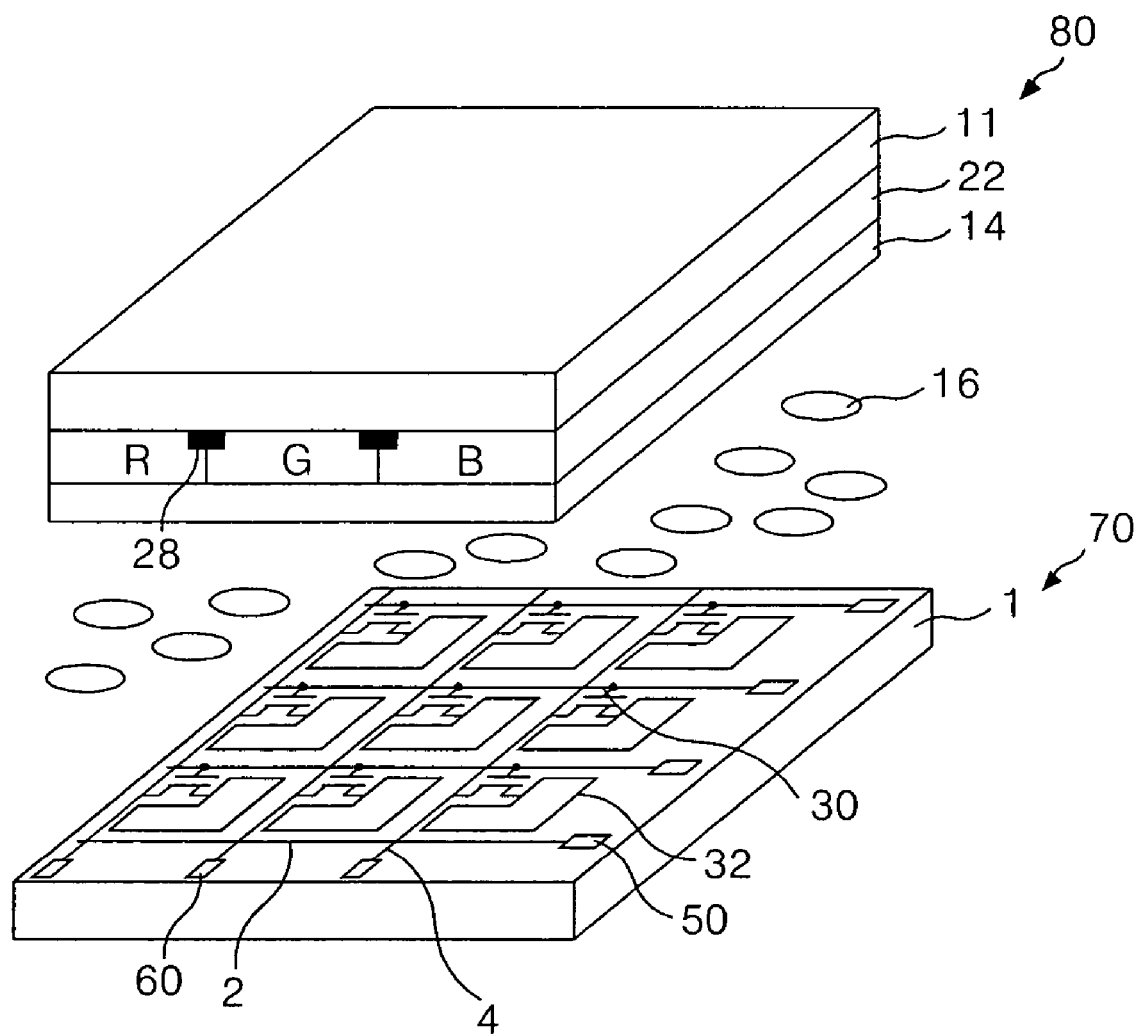
FIG. 1 is a perspective view representing a liquid crystal display panel of the related art.
Figure 2A:
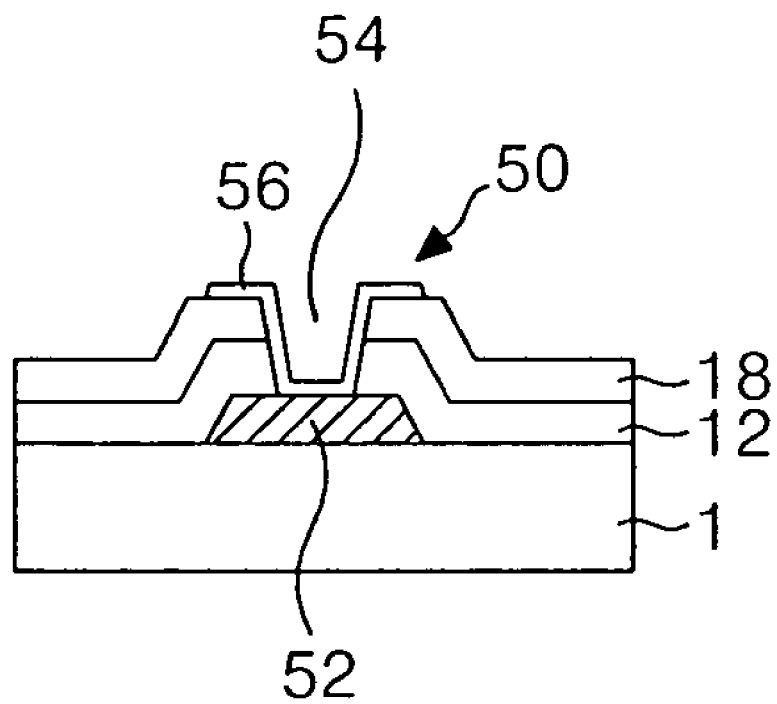
FIGS. 2A and 2B are sectional diagrams representing a gate pad and a data pad shown in FIG. 1.
Figure 2B:
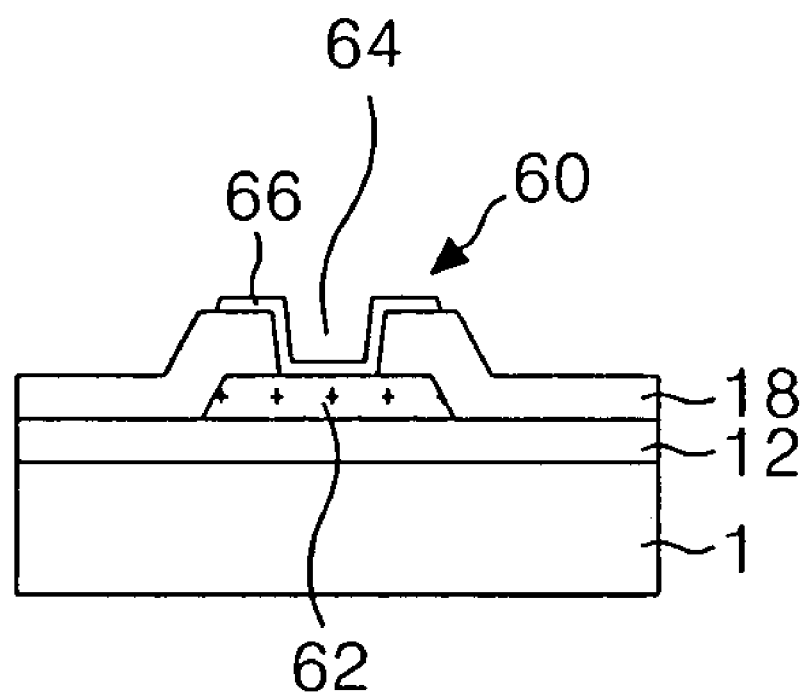
Figure 3:
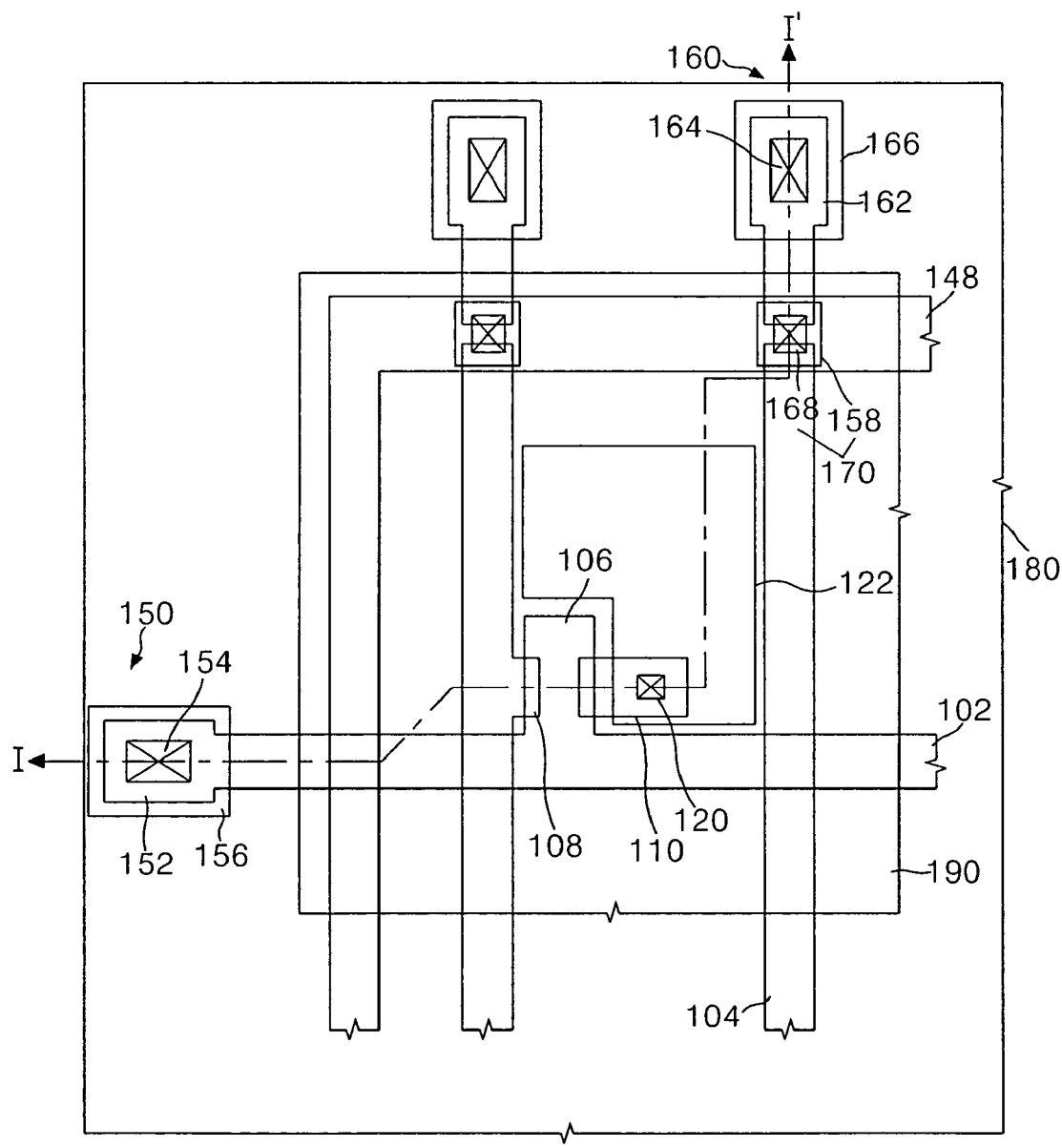
FIG. 3 is a plan view representing a liquid crystal display panel according to an embodiment of the present invention.
Figure 4:
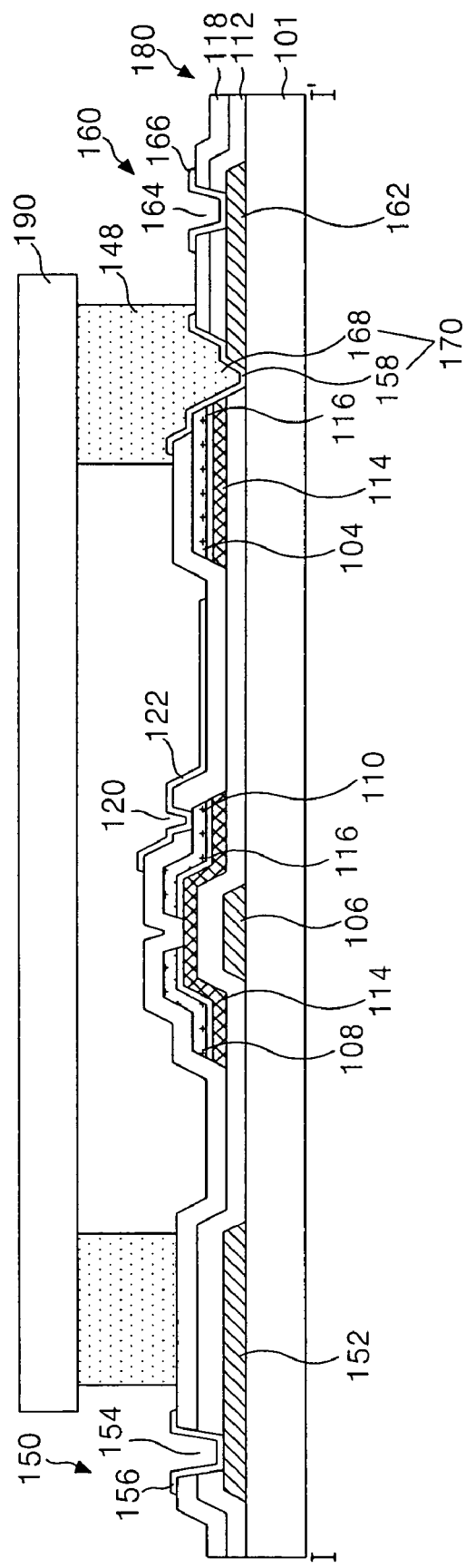
FIG. 4 is a sectional diagram representing a liquid crystal display panel taken along the line I-I' of FIG. 3.

The liquid crystal display panel shown in FIGS. 3 and 4 includes a thin film transistor substrate 180 and a color filter substrate 190 opposing each other with a liquid crystal layer therebetween. The liquid crystal display panel also includes a lower substrate 101.

The color filter substrate 190 includes a gate line 102 and a data line 104 crossing each other, a thin film transistor formed at a crossing thereof, and a pixel electrode 122 connected to the thin film transistor and formed in part in first contact hole 120.

The thin film transistor selectively supplies a data signal from the data line 104 to the pixel electrode 122 in response to a gate signal from the gate line 102. The thin film transistor includes a gate electrode 106 connected to the gate line 102, a source electrode 108 included in the data line 104, a drain electrode 110 connected to the pixel electrode 122, an active layer 114 overlapping the gate electrode 106, wherein a gate insulating film 112 is formed therebetween and forms a channel between the source electrode 108 and the drain electrode 110, and an ohmic contact layer 116 enabling the active layer 114 to be in ohmic-contact with the source electrode 108 and the drain electrode 110.

The pixel electrode 122 is connected to the drain electrode 110 in a pixel area provided by a crossing of the data line 104 and the gate line 102. The pixel electrode 122 generates an electric field due to a potential difference with a common electrode (not shown) using a data signal supplied through the thin film transistor. The electric field causes the liquid crystal to rotate, and light transmittance varies according to the extent of rotation of the liquid crystal.

The gate line 102 is connected to a gate driver (not shown) through a gate pad 150. The gate pad 150 includes a gate pad lower electrode 152 extending from the gate line 102 and a gate pad upper electrode 156 connected to the gate pad lower electrode 152 through a second contact hole 154 which penetrates a gate insulating film 112 and a passivation film 118. The gate pad lower electrode 152 is formed of the same gate metal material as the gate line 102 or a double layered structure of the gate metal material. For example, the gate metal material includes Al group, Mo group, Cr group, Cu group, Al alloy, Mo alloy, Cr alloy and/or Cu alloy.

The data line 104 is connected to a data driver (not shown) through the data pad 160. The data pad 160 includes a data pad lower electrode 162 connected through a contact part 170 to the data line 104, and a data pad upper electrode 166 connected to the data pad lower electrode 162 through a third contact hole 164 which penetrates the gate insulating film 112 and the passivation film 118. The data pad lower electrode 162 is formed of the same gate metal material as the gate line 102 or a double layered structure of the gate metal material, for example, Al group, Mo group, Cr group, Cu group, Al alloy, Mo alloy, Cr alloy and/or Cu alloy.

The contact part 170 is formed in an area that overlaps a sealant 148. The contact part 170 includes a fourth contact hole 168 which exposes the data line 104 and the data pad lower electrode 162, and a contact electrode 158 for connecting the data line 104 and the data pad lower electrode 162 which are exposed through the fourth contact hole 168. The fourth contact hole 168 penetrates the gate insulating film 112 and the passivation film 118 to expose the end of each of the data line 104 and the data pad lower electrode 162. Specifically, the fourth contact hole 168 exposes the end of each of the data line 104 and a data link (not shown). The contact electrode 158 is formed of a transparent conductive material such as indium tin oxide (ITO), indium zinc oxide (IZO), tin oxide (TO), or indium tin zinc oxide (ITZO).

Figure 5A:
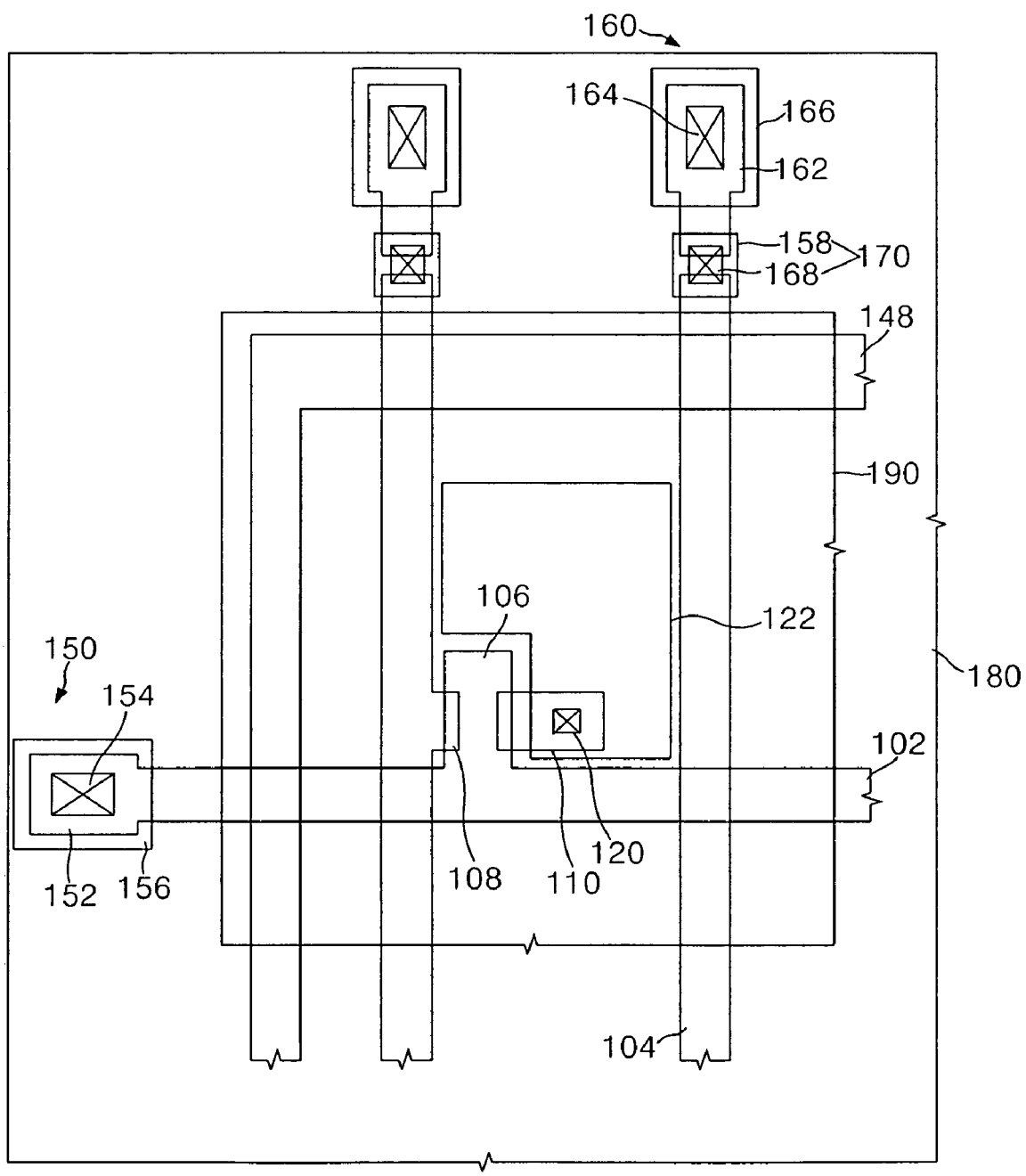
FIGS. 5A and 5B are plan views for explaining a defect phenomenon associated with the location of a contact part shown in FIG. 4.

The contact part shown in FIGS. 3 and 4 may prevent damage of the contact electrode 158, the data line 104, and the data pad lower electrode 162 caused by outside moisture or impurities compared to the contact part 170 formed outside the sealant 148, as shown in FIG. 5A. Accordingly, the liquid crystal display panel shown in FIGS. 3 and 4 has an improved reliability compared to the liquid crystal display panel shown in FIG. 5A.

Figure 5B:
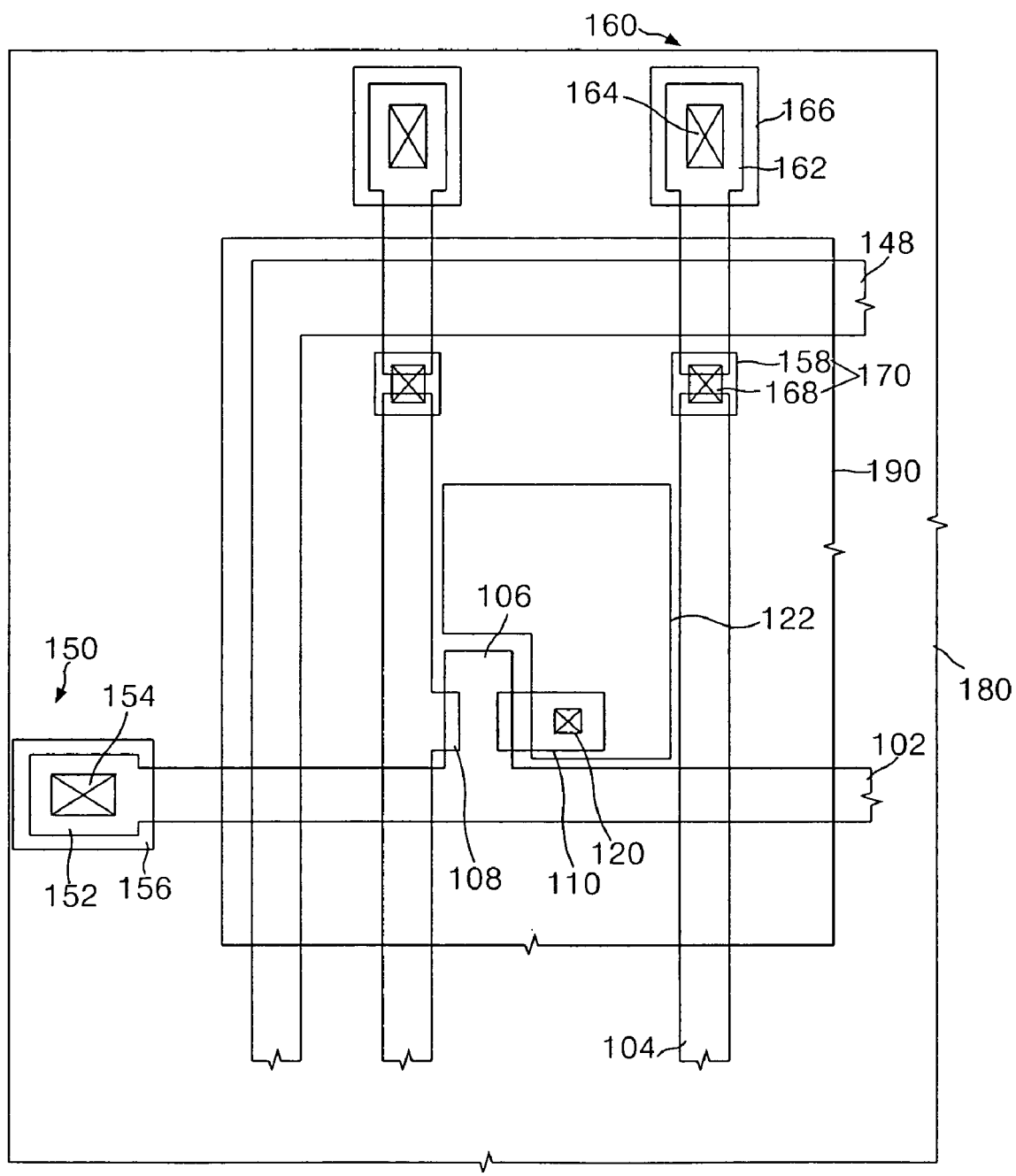

Further, the contact part 170 shown in FIGS. 3 and 4 may reduce a liquid crystal margin area compared to the case when the contact part 170 is formed in an active area which is limited by the sealant 148, as shown in FIG. 5B. Herein, the liquid crystal margin area is located in the active area into which the liquid crystal is formed, but is an area where no picture is realized. The liquid crystal display panel shown in FIG. 4, in which the liquid crystal margin area is reduced, may have a reduced substrate size compared to the liquid crystal display panel shown in FIG. 5B. Thus, the liquid crystal display panel can be made in a small size.

In this way, the liquid crystal display panel according to the present invention enables the signal line to be connected to the pad electrode through the contact part. Furthermore, the liquid crystal display panel according to the present invention forms the contact part to overlap the sealant. Accordingly, it is possible to prevent corrosion of the electrode in the contact part and reduce the liquid crystal margin area.

FIGS. 6A to 6D are sectional diagrams representing a fabricating method of a transflective thin film transistor substrate of a liquid crystal display panel shown in FIG. 4.

Figure 6A:
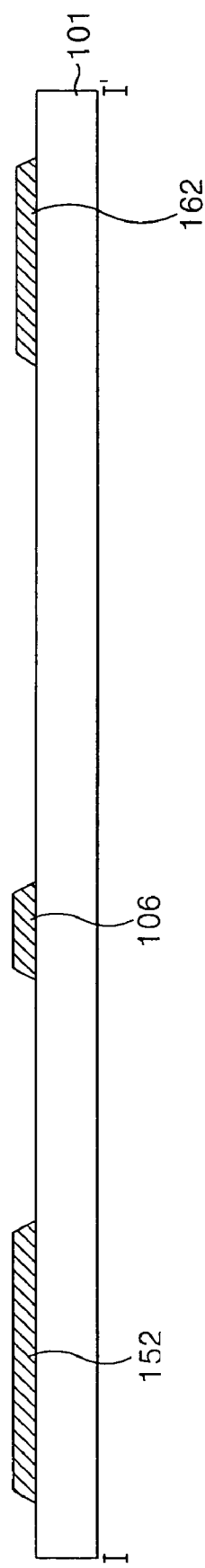

Referring to FIG. 6A, a first conductive pattern group having the gate line (not shown), the gate electrode 106, the gate pad lower electrode 152 and the data pad lower electrode 162 is formed on a lower substrate 101.

A gate metal layer is formed on the lower substrate 101 by a deposition method such as sputtering. The gate metal layer is patterned by a photolithography process and an etching process, thereby forming the first conductive pattern group having the gate line, the gate electrode 106, the gate pad lower electrode 152 and the data pad lower electrode 162. The gate metal layer is made of metal such as Al group metals and has a single or double layered metal structure.

Figure 6B:
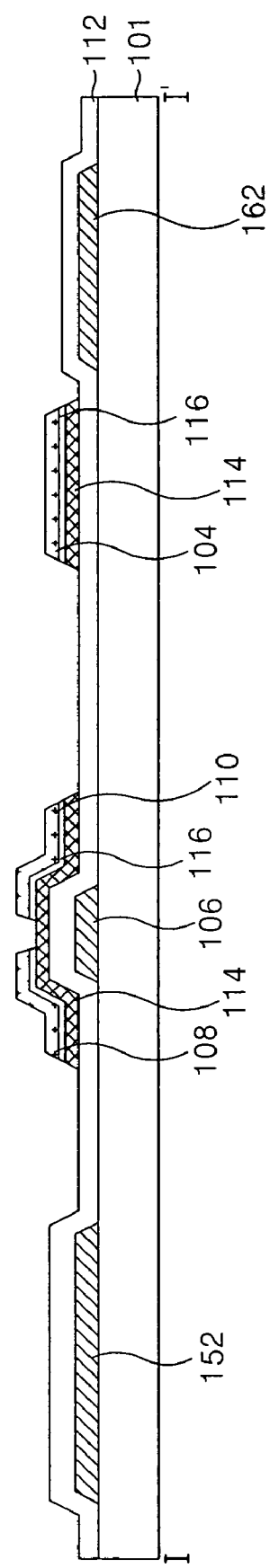

Referring to FIG. 6B, a gate insulating film 112 is formed on the lower substrate 101 where a first conductive pattern group is formed. A semiconductor pattern having an active layer 114 and an ohmic contact layer 116 and a second conductive pattern group including the data line 104, the source electrode 108 and the drain electrode 110 are formed thereon.

The gate insulating film 112, an amorphous silicon layer, an amorphous silicon layer doped with impurities, and a source/drain metal layer are sequentially formed on the lower substrate 101 where the first conductive pattern group is formed by a deposition method such as plasma enhanced chemical vapor deposition (PECVD) or sputtering. The gate insulating film 112 is formed of an inorganic insulating material such as silicon oxide ($SiO_x$) or silicon nitride ($SiN_x$), and the source/drain metal layer is formed of Al group, Mo group, Cr group, Cu group, Al alloy, Mo alloy, Cr alloy and Cu alloy, or a double layered structure of thereof.

Then, there is formed a photo-resist pattern where a channel part on the source/drain metal layer has a lower height than in another part of the source/drain metal layer. The source/drain metal layer is patterned by a wet etching process using the photo-resist pattern, thereby forming the second conductive pattern group including the drain electrode 110 that is integrated with the source electrode 108.

Then, the amorphous silicon layer doped with the impurities and the amorphous silicon layer are simultaneously patterned by a dry etching process using the same photo-resist pattern, thereby forming the ohmic contact layer 116 and the active layer 114.

Then, after removing the photo-resist pattern which has a relatively low height in the channel part by an ashing process, the source/drain pattern and the ohmic contact layer 116 of the channel part are etched by the dry etching process. Accordingly, the active layer 114 of the channel part is exposed and the source electrode 108 is separated from the drain electrode 110.

Subsequently, the photo-resist pattern remaining on the second conductive pattern group is removed by a stripping process.

Referring to FIG. 6C, the passivation film 118 having first to fourth contact holes 120, 154, 164 and 168 is formed on the substrate 101 where the second conductive pattern group is formed.

The passivation film 118 is formed on the gate insulating film 112 where the second conductive pattern group is formed. The passivation film 118 is formed of an inorganic insulating material similar to the gate insulating film 112 or an organic insulating material such as acrylic resin, BCB and so on. The passivation film 118 is patterned by a photolithography process and an etching process to form the passivation film having the first to fourth contact holes 120, 154, 164 and 168. The first contact hole 120 penetrates the passivation film 118 to expose the drain electrode 110 of the thin film transistor, the second contact hole 154 penetrates the gate insulating film 112 and the passivation film 118 to expose the gate pad lower electrode 152, the third contact hole 164 penetrates the gate insulating film 112 and the passivation film 118 to expose the data pad lower electrode 162, and the fourth contact hole penetrates the gate insulating film 112 and the passivation film 118 to expose the end of the data line 104 and the end of the data pad lower electrode 162.

Figure 6D:
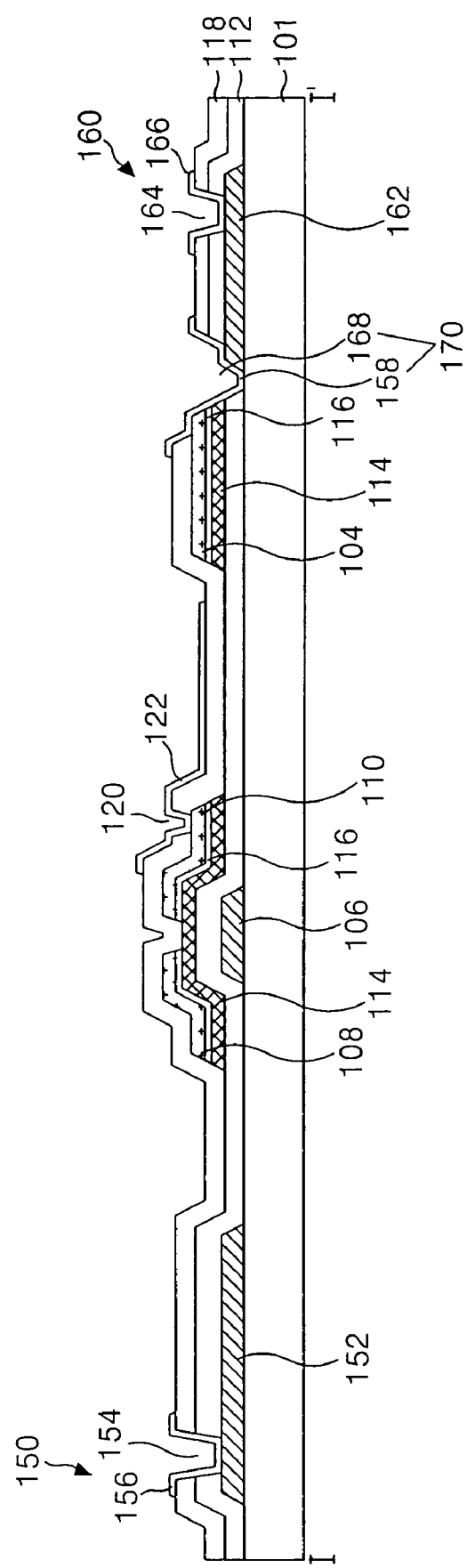

Referring to FIG. 6D, a third conductive pattern group having the pixel electrode 122, the gate pad upper electrode 156, the data pad upper electrode 166 and the contact electrode 158 is formed on the passivation film 118. Contact part 170 is also formed.

A transparent conductive layer is formed on the passivation film 118 by a deposition method such as sputtering. The transparent conductive layer is patterned by a photolithography process and an etching process, thereby forming the third conductive pattern group having the pixel electrode 122, the gate pad upper electrode 156, the data pad upper electrode 166 and the contact electrode 158. The transparent conductive layer is formed of ITO, TO, IZO or ITZO. Gate pad 150 and data pad 160 are formed.

Figure 7:
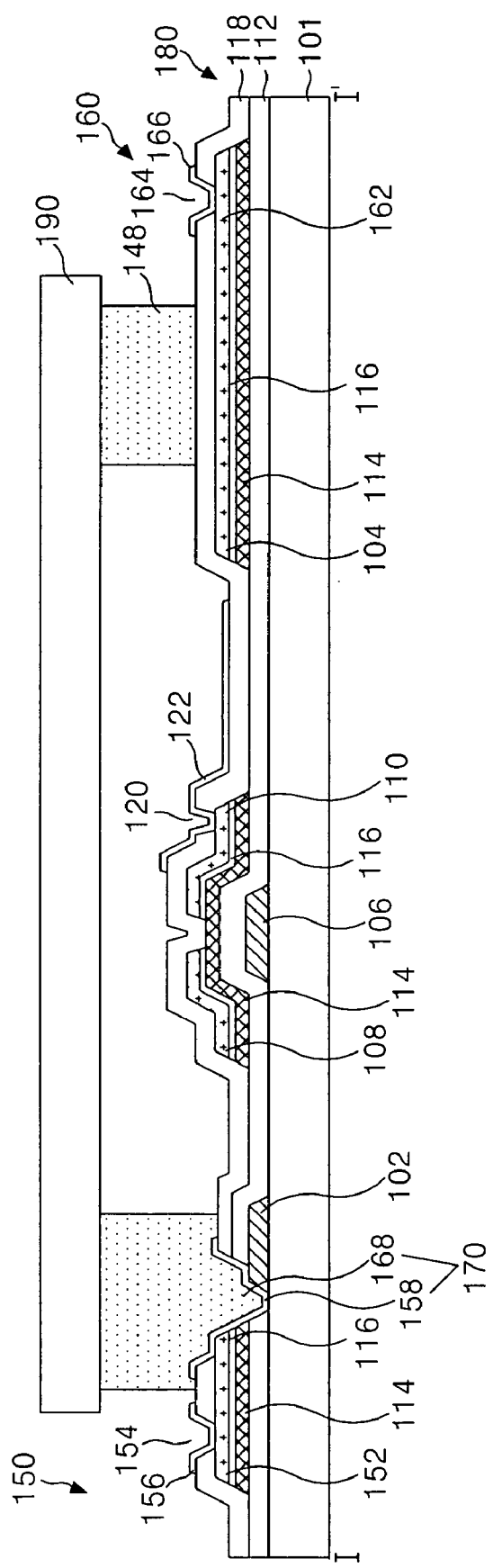
FIG. 7 is a sectional diagram representing a liquid crystal display panel according to another embodiment of the present invention.

FIG. 7 is a plan view representing a liquid crystal display panel according to another embodiment of the present invention.

The liquid crystal display panel shown in FIG. 7 has the same components as the liquid crystal display panel shown in FIGS. 3 and 4 except that the gate pad lower electrode 152 and the gate line 102 are formed of a different metal. Accordingly, a detailed description of the same components will be omitted.

The lower electrodes 152, 162 of the gate pad 150 and the data pad 160 are formed of the source/drain metal layer. In this case, the contact part 170 for connecting the gate pad 150 and the gate line 102 is formed to overlap the sealant 148. The contact part 170 includes a contact hole 168 that exposes the end of the gate line 102 and the end of the gate pad lower electrode 152, and a contact electrode 158 that connects the gate line 102 to the gate pad lower electrode 152 through the contact hole 168.

Figure 8:
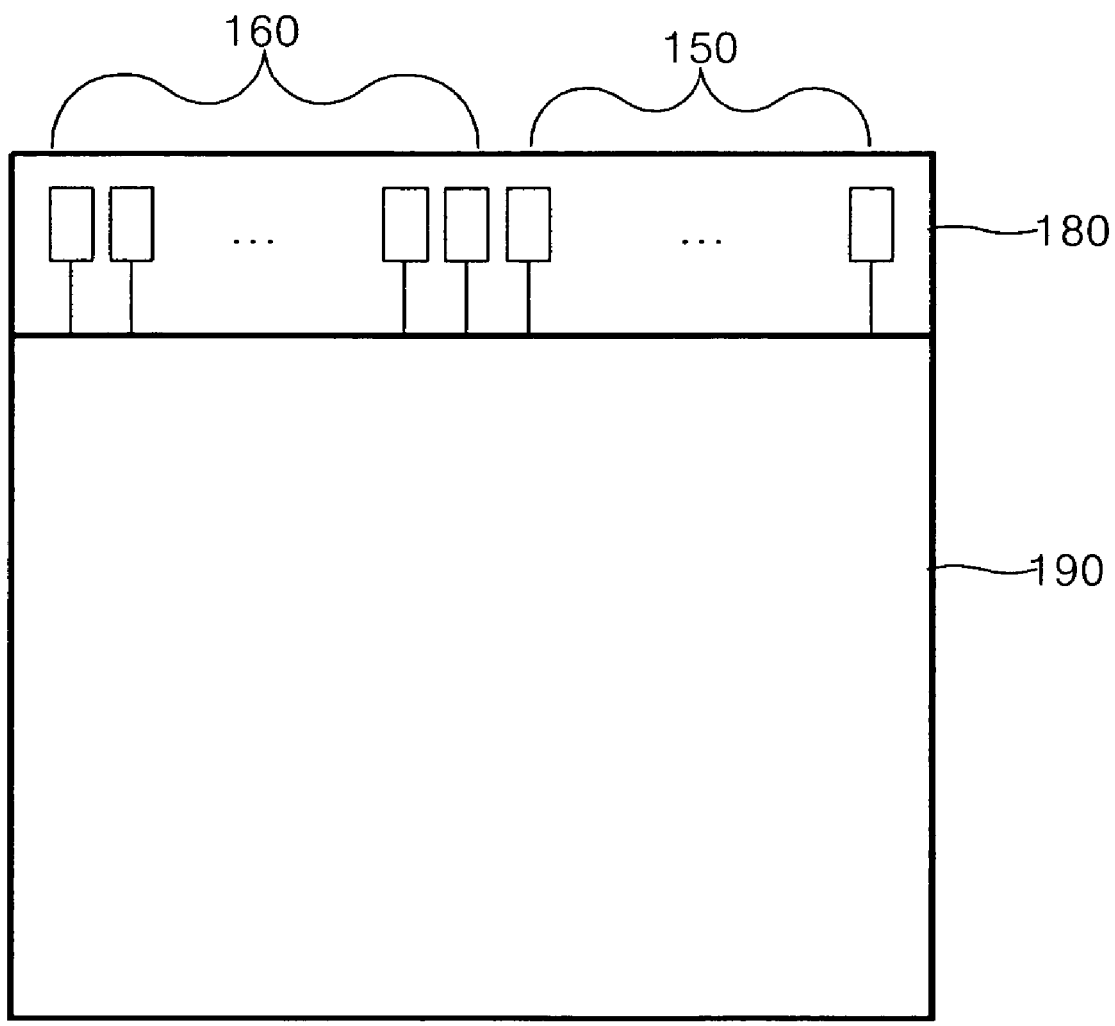
FIG. 8 is a plan view representing a liquid crystal display panel according to a yet another embodiment of the present invention.
Figure 9:
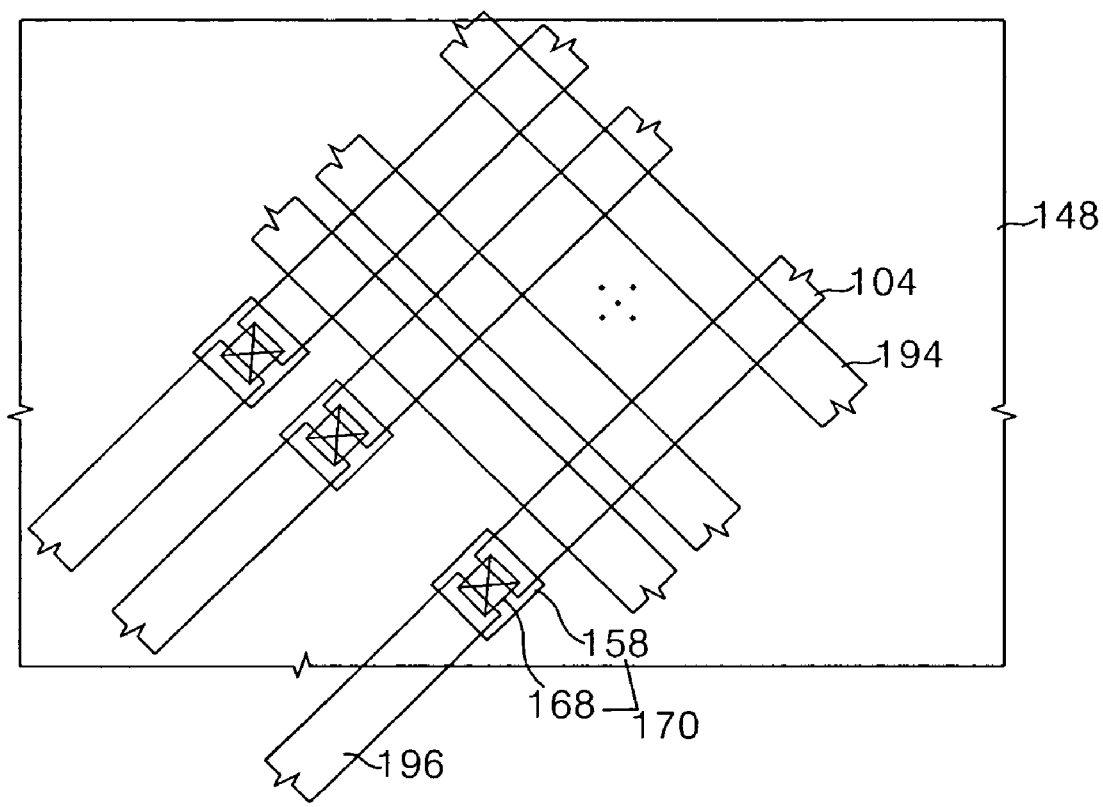
FIG. 9 is a plan view representing a link connected to a gate pad and a data pad shown in FIG. 8.

FIG. 8 is a plan view representing a liquid crystal display panel according to yet another embodiment of the present invention, and FIG. 9 is a plan view representing a link part of FIG. 8. Herein, the gate pad and the data pad shown in FIG. 8 are formed in one structure of the gate pad and the data pad shown in FIGS. 4 and 7. The gate pad and the data pad of the liquid crystal display panel according to this embodiment of the present invention will be explained by taking the gate pad 150 and the data pad 160 shown in FIG. 4 as an example.

The liquid crystal display panel shown in FIG. 8 has the gate pad 150 and the gate pad 160 located in parallel in the same area to enable reduction of substrate size. In this case, a gate link 194 located between the gate pad 150 and the gate line and a gate link 196 located between the data pad 160 and the data line are formed in a crossing structure as shown in FIG. 9. The contact part 170 for connecting the data link 196 and the data line 104 which are formed on a difference plane from the crossing part is formed to overlap the sealant 148.

In this way, the liquid crystal display panel according to this embodiment of the present invention has the contact part 170 and the crossing part between the gate link 196 and the gate link 194 formed to overlap the sealant. Thus, the liquid crystal margin area is reduced compared to the liquid crystal display panel where the crossing part and the contact part are formed inside the active area. Accordingly, the size of the substrate may be reduced by as much as the reduced liquid crystal margin area. Thus, the liquid crystal display panel according to the this embodiment of the present invention can be made small in size.

The above-described embodiments of the present invention may be applicable to a transmissive type, a reflective type, a transflective type, a TN (Twisted Nematic) mode and a IPS (In Plane Switching) mode liquid crystal display device, and its application is not limited to the above-described mode.

As described above, the liquid crystal display panel and the fabricating method thereof according to the present invention has the contact part formed to overlap the sealant. The contact part connects the signal line and the pad electrode, which are formed of different metals on different planes. Accordingly, the liquid crystal display panel and the fabricating method thereof according to the present invention may prevent damage of the electrode, which is formed inside the contact part, caused by moisture and impurities. Further, the contact part of the liquid crystal display panel which is formed in the fabricating method thereof overlaps the sealant. Thus, in the liquid crystal display panel according to the present invention, the liquid crystal margin area is reduced compared to a liquid crystal display panel where the contact part is formed inside the active area. Accordingly, the size of the substrate can be reduced by as much as the reduced liquid crystal margin area. Thus the liquid crystal display panel according to the present invention may be applied in small size.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
first and second substrates bonded with a sealant;
a signal line on the first substrate;
a pad formed on a different plane than the signal line; and
a contact part overlapping the sealant and connecting the signal line to the pad,
wherein the contact part includes:
a single contact hole exposing both of the end of each of the data line and the data pad lower electrode; and a contact electrode connecting the data line and data pad lower electrode that are exposed through the contact hole, wherein all the contact hole overlaps the sealant, wherein the signal line is at least one of a data line and a gate line and the pad is at least one of a data pad and a gate pad, wherein the data pad and a gate pad are located in parallel, and wherein a gate link between the gate line and the gate pad, and a data link between the data line and the data pad are formed in a crossing structure, the crossing part of the gate link and the data link overlaps the sealant.

2. The liquid crystal display panel according to claim 1, wherein the data pad includes:
 a data pad lower electrode formed on a different plane from a data line;
 a contact hole penetrating an insulating film to expose the data pad lower electrode; and
 a data pad upper electrode connected to the data pad lower electrode through the contact hole.

3. The liquid crystal display panel according to claim 2, wherein the data pad lower electrode is formed of a same metal on a same plane as a gate line.

4. The liquid crystal display panel according to claim 2, wherein the gate pad includes:
 a gate pad lower electrode extending from a gate line;
 a second contact hole penetrating the insulating film to expose the gate pad lower electrode; and
 a gate pad upper electrode connected to the gate pad lower electrode through the second contact hole.

5. The liquid crystal display panel according to claim 1, wherein the first substrate is a thin film transistor substrate and the second substrate is a color filter substrate.

6. The liquid crystal display panel according to claim 5, wherein the thin film transistor substrate includes: a gate line and a data line crossing each other; a thin film transistor formed at a crossing thereof; and a pixel electrode connected to the thin film transistor and formed in part in a contact hole, wherein the thin film transistor includes a gate insulating film between a gate electrode and an active layer, forming a channel between a source electrode and a drain electrode.

7. A method of fabricating a liquid crystal display panel, comprising:
 forming a signal line on a first substrate;
 forming a pad on a different plane than the signal line;
 forming a contact part connecting the signal line to the pad; and
 forming a sealant bonding the first substrate and a second substrate in an area, the contact part overlapping the sealant in the area,
 wherein forming the contact part includes:
 forming a single contact hole exposing both of an end of each of the data line and the data pad lower electrode; and
 forming a contact electrode connecting the data line and data pad lower electrode that are exposed through the contact hole,
 wherein all the contact hole overlaps the sealant
 wherein the signal line is at least one of a data line and a gate line and the pad is at least one of a data pad and a gate pad,
 wherein the data pad and a gate pad are located in parallel, and
 wherein a gate link between the gate line and the gate pad, and a data link between the data line and the data pad are formed in a crossing structure, the crossing part of the gate link and the data link overlap the sealant.

8. The method according to claim 7, wherein forming the pad includes:
 forming a data pad lower electrode on a different plane than a data line;
 forming a contact hole penetrating an insulating film to expose the data pad lower electrode; and
 forming a data pad upper electrode connected to the data pad lower electrode through the contact hole.

9. The method according to claim 8, further comprising:
 forming a gate pad lower electrode extended from a gate line;
 forming a second contact hole penetrating the insulating film to expose the gate pad lower electrode; and
 forming a gate pad upper electrode connected to the gate pad lower electrode through the second contact hole.

* * * * *